(12) United States Patent
Mecayten et al.

(10) Patent No.: US 11,792,325 B2
(45) Date of Patent: Oct. 17, 2023

(54) PREDICTIVE SCREEN RECORDING

(71) Applicant: NICE LTD., Ra'anana (IL)

(72) Inventors: Ofir Mecayten, Karkur (IL); Yaron Cohen, Modiin (IL); Yossi Neeman, Ra'anana (IL)

(73) Assignee: NICE LTD., Ra'anana (IL)

( * ) Notice: Subject to any disclaimer, the term of this patent is extended or adjusted under 35 U.S.C. 154(b) by 174 days.

(21) Appl. No.: 17/544,969

(22) Filed: Dec. 8, 2021

(65) Prior Publication Data

US 2023/0179712 A1 Jun. 8, 2023

(51) Int. Cl.
*H04M 3/523* (2006.01)
*H04M 3/51* (2006.01)
*G06Q 10/06* (2023.01)
*G06Q 10/0639* (2023.01)

(52) U.S. Cl.
CPC .... *H04M 3/5233* (2013.01); *G06Q 10/06393* (2013.01); *G06Q 10/06395* (2013.01); *H04M 3/5175* (2013.01); *H04M 3/5237* (2013.01); *H04M 2203/402* (2013.01)

(58) Field of Classification Search
CPC ...... G06Q 10/06393; G06Q 10/06395; H04M 3/51; H04M 3/5175; H04M 3/523; H04M 3/5233; H04M 3/5237; H04M 2203/402
USPC ............ 379/265.06, 265.07, 265.08, 265.12
See application file for complete search history.

(56) References Cited

U.S. PATENT DOCUMENTS

| | | | | |
|---|---|---|---|---|
| 6,542,602 B1* | 4/2003 | Elazar | ................ | H04M 3/5183 379/265.06 |
| 9,479,727 B1* | 10/2016 | Kolodizner | ......... | H04M 3/5183 |
| 2007/0195945 A1* | 8/2007 | Korenblit | ............... | G06Q 50/20 379/265.06 |
| 2010/0064215 A1* | 3/2010 | Portman | ................... | G06F 3/14 715/704 |
| 2013/0142332 A1* | 6/2013 | Ramos | ................... | H04N 7/167 380/236 |
| 2015/0098560 A1* | 4/2015 | McCormack | ....... | H04M 3/5175 379/265.06 |
| 2015/0378577 A1* | 12/2015 | Lum | ...................... | G06F 3/048 715/720 |
| 2021/0051231 A1* | 2/2021 | Cohen | .................. | H04N 9/8205 |

* cited by examiner

*Primary Examiner* — Harry S Hong
(74) *Attorney, Agent, or Firm* — SOROKER-AGMON-NORDMAN-RIBA; Sharone Godesh; Liat Lin

(57) ABSTRACT

A computerized-method for a personalized screen recording in a contact center is provided herein. The computerized-method includes, before each interaction between an agent and a customer, operating a predictive screen recording module to yield an Agent Recording Percentage (ARP) value; and based on the ARP value, operating a recording of screen events module for recording one or more voice or digital interactions, on one or more screens associated to a computing device of the agent.

12 Claims, 7 Drawing Sheets

400B

| Agent Identifier | |
|---|---|
| Data element name | Average value |
| Agent Customer Satisfaction Score (CSAT) | 3 |
| Sentiment | 15% |
| Number of holds | 2 |
| Hold duration | 45 |

| Quality plan parameters | |
|---|---|
| Data element name | Condition |
| Agent Customer Satisfaction Score (CSAT) | < 5 |
| Sentiment | > 30% |
| Number of holds | >= 1 |
| Hold duration | > 60 sec |

Figure 4A

| Agent ID | AVG CSAT | AVG Negative Sentiment | AVG # of holds | AVG Hold Duration | Positive Matches |
|---|---|---|---|---|---|
| A1 | 3 | 40% | 4 | 50 | 0 |
| A2 | 3 | 40% | 4 | 80 | 1 |
| A3 | 3 | 40% | 1 | 80 | 2 |
| A4 | 3 | 10% | 1 | 80 | 3 |
| A5 | 6 | 10% | 1 | 80 | 4 |

PREDICTIVE SCREEN RECORDING

TECHNICAL FIELD

The present invention relates to the field of video recordings, and more specifically to a method and system for predictive screen recording in contact centers.

BACKGROUND

To assure high service quality, current systems of contact centers are monitoring interactions between agents and customers for evaluation purposes and follow up actions, such as coaching plans, agents' performance improvement and the like. The monitoring for evaluation of the agents' performance during interactions is based on calls recordings and screen recordings of events that took place during the interaction. The events may be for example, usage of applications, request for help from a supervisor during the interaction, upsell activities, usage of knowledgebase, transfer of the interaction to another agent.

Quality Management (QM) policies may be defined to include a predefined number of evolutions per agent per week, commonly two for each agent. A quality plan is a tool that implements quality management policies for quality assurance purposes. QM applications samples interactions and based on predefined filters sends interactions to evaluators for review.

Due to a high cost of storage space which the screen recordings of all agent interactions may hold, currently only a specific predetermined percentage of the interactions, e.g., 30 percent are recorded for each agent similarly for all agents. Commonly an agent maintains many interactions during a shift, but out of the recorded flat percentage, only a few of them, e.g., two interactions per week, may be evaluated for service quality purposes.

The decision of whether interactions should be recorded, e.g., screen recording, and voice recording is random and made at the beginning of the interaction. However, when the decision to operate the screen recording is random and up to the specific predetermined percentage of the interactions of the agent, then, on one hand, for high-level performance agents, most of the recorded interactions will be good, and interactions which requires a correcting feedback might be rare, hence too few recordings for service quality evaluation. On the other hand, for low-level performance agents, there may be many interactions that have been recorded, which evaluators may receive and use to provide correcting feedback, therefore most of these screen recordings may be redundant.

Accordingly, there is a need for a technical solution for predicting the necessity of screen recording for each agent at the beginning of each interaction to operate less screen recordings for low-level performance agents and more screen recordings for high-level performance agents, thus saving the cost of screen recording storage space.

Furthermore, there is a need for a personalized screen recording for each agent in a contact center.

SUMMARY

There is thus provided, in accordance with some embodiments of the present disclosure, a computerized-method for a personalized screen recording in a contact center.

In accordance with some embodiments of the present disclosure, in a computerized system having one or more processors, a data store, a memory to store the data store, a communication interface to communicate via a communication network with one or more agent computing device. Before each interaction between an agent and a customer, operating a predictive screen recording module to yield an Agent Recording Percentage (ARP) value.

Furthermore, in accordance with some embodiments of the present disclosure, based on the ARP value, operating a recording of screen events module for recording one or more voice or digital interactions, on one or more screens associated to a computing device of the agent.

Furthermore, in accordance with some embodiments of the present disclosure, the predictive screen recording module may include: (i) receiving a quality plan having conditions for '1' parameters; (ii) retrieving a calculated Personal Performance Indication Vector (PPIV) of the agent having the '1' parameters, from the data store; comparing each parameter in the calculated PPIV to a related condition of the parameter in the quality plan to find a matching level; calculating an initial Agent Recording Percentage (iARP); and normalizing the calculated iARP to an ARP value.

Furthermore, in accordance with some embodiments of the present disclosure, the calculating of the PPIV having the '1' parameters may be performed by operating a PPIV module. The PPIV module may include: (1.1) retrieving metadata parameters of interactions of the agent during a preconfigured period from a data store of interactions details; (1.2) calculating an average of each parameter of the retrieved metadata parameters; (2.1) retrieving Quality Management (QM) data parameters of the agent during a preconfigured period from a data store associated with a QM application; (2.2) calculating an average of each parameter of the retrieved. QM data parameters; and (3) using the average of each parameter of the retrieved metadata parameters and the average of each parameter of the retrieved QM data parameters to calculate the PPIV having the '1' parameters.

Furthermore, in accordance with some embodiments of the present disclosure, the parameters of the metadata of the interactions of the agent may be selected from at least one of: interaction duration, number of holds, hold durations, number of transfers, customer sentiment, after call work duration and any combination thereof.

Furthermore, in accordance with some embodiments of the present disclosure, the QM data parameters may be selected from at least one of: agent QM score, agent seniority, agent Customer Satisfaction Score (CSAT), agent First Call Resolution (FCR) and any combination thereof.

Furthermore, in accordance with some embodiments of the present disclosure, the quality plan having '1' parameters and related conditions comprising parameters which are selected from at least one of: agent seniority, agent CSAT, agent FCR, interaction duration, number of holds, hold durations, number of transfers, customer sentiment, after call work duration, and any combination thereof.

Furthermore, in accordance with some embodiments of the present disclosure, the matching level is one of '1+1' matching levels. When none of the agent's '1' averaged parameters match the '1' conditions in the quality plan, the matching level may be '0'.

Furthermore, in accordance with some embodiments of the present disclosure, the calculating of the iARP may be based on formula I:

for $(0 ==n<=L)$ $$iARPn = MAX[B, n*Wn] \qquad (I)$$

whereby:

n is a matching level,
L is a length of PPIV,
B is a preconfigured minimal allowed recording percentage, and
Wn is a weight factor per each parameter of PPIV and it may be calculated based on formula II:

$$Wn=100/L. \qquad (II)$$

Furthermore, in accordance with some embodiments of the present disclosure, the normalizing of the calculated iARP to the ARP may be performed based on formula III:

for $(0==n<=L)$ $$ARPn=MAX[B,F*iARPn] \qquad (III)$$

whereby:
n is a matching level,
B is a preconfigured minimal allowed recording percentage,
M is a preconfigured maximal recording percentage,
F is a preconfigured factor, and it is calculated based on formula (IV):

$$F=M/MAX[iARP_n], \qquad (IV)$$

whereby:
iARPn is an initial ARP for an '1' matching level.

Furthermore, in accordance with some embodiments of the present disclosure, the operating of the recording of screen events module for recording one or more voice or digital interactions, on one or more screens which are associated to the computing device of the agent may be performed when a randomly generated number is below the yielded ARP value.

Furthermore, in accordance with some embodiments of the present disclosure, a calculation of the calculated PPIV may be performed each time data is updated or every preconfigured period.

Furthermore, in accordance with some embodiments of the present disclosure, the '1' parameters of the calculated PPIV and the related conditions of the quality plan are preconfigured.

There is further provided, in accordance with some embodiments of the present invention, a computerized-system for a predictive screen recording in a contact center.

Furthermore, in accordance with some embodiments of the present disclosure, the computerized-system may include one or more processors, a data store, a memory to store the data store, and a communication interface to communicate via a communication network with one or more agent computing devices.

Furthermore, in accordance with some embodiments of the present disclosure, before each interaction between an agent and a customer, the one or more processors may be configured to: operate a predictive screen recording module to yield an Agent Recording Percentage (ARP) value; and based on the ARP value, operate a recording of screen events module for recording one or more voice or digital interactions, on one or more screens associated to a computing device of the agent.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by reference numerals.

FIGS. 4A-4B shows an example of quality plan parameters and an example of agent Personal Performance Indication Vector (PPIV), in accordance with some embodiments of the present invention;

FIG. 6 is a table showing an example of matching levels of agents, in accordance with some embodiments of the present invention.

DETAILED DESCRIPTION

Figure 1:
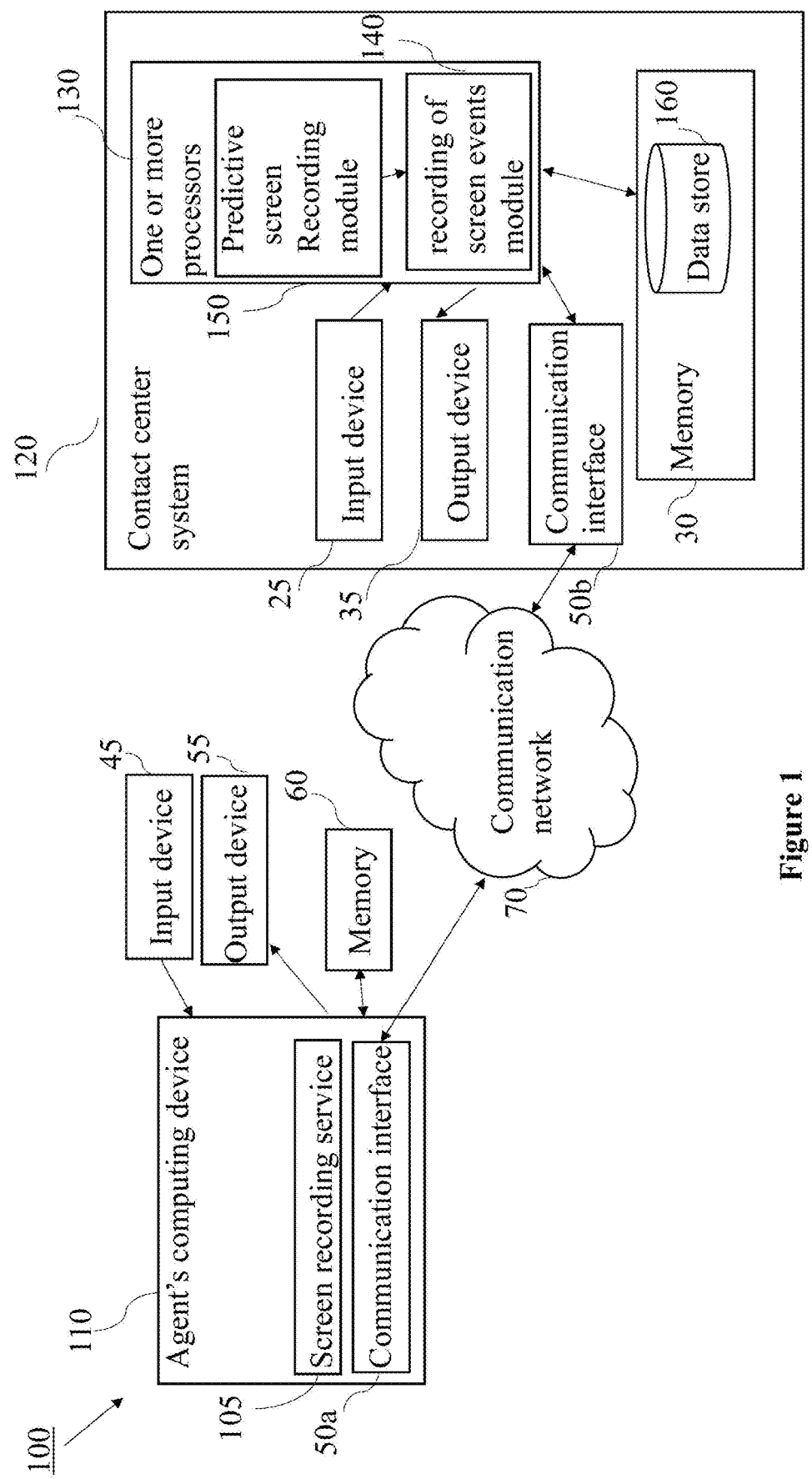
FIG. 1 schematically illustrates a high-level diagram of a computerized-system for a personalized screen recording in a contact center, in accordance with some embodiments of the present invention.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "calls" or "interactions" refers to voice and digital interactions of agents in a contact center.

As used herein, the term "recording" "recordings" refers to voice and screen recordings of agent interactions.

As used herein, the term "matching level" refers to the number of matches in a comparison of '1' averaged parameters of an agent to '1' conditions in a quality plan.

As used herein, the term "customer sentiment' refers to a negative sentiment or a positive sentiment.

Current technical solutions for video and call recording for an agent's performance evaluation, provides a flat percentage of video and call recordings for all agents during an agent's shift and does not distinguish between well-performing agents and bad-performing agents. Therefore, current solutions do not provide the required number of calls during a period that may be suitable to select from for quality evaluation, in accordance with the agent's performance because for high-performance agents there will be too few recordings and for low-performance agents there will be too many.

For example, when the percentage of recording is set to 30%, then for both low-level agents and high-level agents from 100 interactions during a shift of each agent, 30 interactions may be recorded randomly. However, for the low-level agents it is most likely that most of the 30 recordings will be suitable for evaluation purposes, therefore, less recordings could have been recorded and recording resources and storage space could have been saved.

Thus, in case there are 100 agents during a shift, when for example, the flat percentage is set to 30% for each agent, then there may be a total of 3,000 recordings per shift. However, practically 33 low-level agents may require only 15 recordings each, 33 mid-level agents may require only 20 recordings each and 34 high-level agents may require 30 recordings each for a total of 2,175 recordings instead of 3,000 recordings. The required number of recordings is according to the relationship between agent's level of performance and the likelihood or statistical chances to retrieve recordings from the number of recordings, that will be suitable for evaluation purposes, e.g., 2 recordings per week, as described above.

There is a need for a technical solution to optimize the screen recording with customer compatible screen recording, that is based on a customer Quality Management (QM) quality plan settings. There is a need for a technical solution that may determine the percentage of video and call recordings during a shift for each agent personally based on the agent's level of performance. Furthermore, there is a need for a system and method for a personalized screen recording in a contact center.

FIG. 1 schematically illustrates a high-level diagram of a computerized-system 100 for a personalized screen recording in a contact center, in accordance with some embodiments of the present invention.

According to some embodiments of the present disclosure, in a system, such as computerized-system 100 that includes a contact center system, such as contact center system 120 that includes one or more processors 130, a data store, such as data store 160, a memory 30 to store the data store 160, a communication interface 50b to communicate via a communication network 70 with one or more agent computing devices, such as agent's computing device 110.

According to some embodiments of the present disclosure, an agent's computing device 110 may include an input device 45, an output device 55 and a memory 60, as well as a communication interface 50a and screen recording service 105 to record events during agent's interactions. The recorded events may be for example, usage of contact center applications, request for help from a supervisor during the interaction, upsell activities, usage of a knowledgebase, transfer of the interaction to another agent and other events.

According to some embodiments of the present disclosure, the recording of screen events module 140 may dynamically set the agent's recording percentage according to the agent's historical performance during interactions. By analyzing the agents' historical call rating on several quality management aspects, a personalized recording percentage for each agent of the agents, may be calculated, e.g., an Agent Recording Percentage (ARP) value.

According to some embodiments of the present disclosure, a module, such as predictive screen recording module 150, may be operated to yield an Agent Recording Percentage (ARP) value. Based on the ARP value, operating a module, such as recording of screen events module 140 for recording one or more voice or digital interactions, on one or more screens associated to a computing device of the agent, such as agent's computing device 110.

Figure 5:
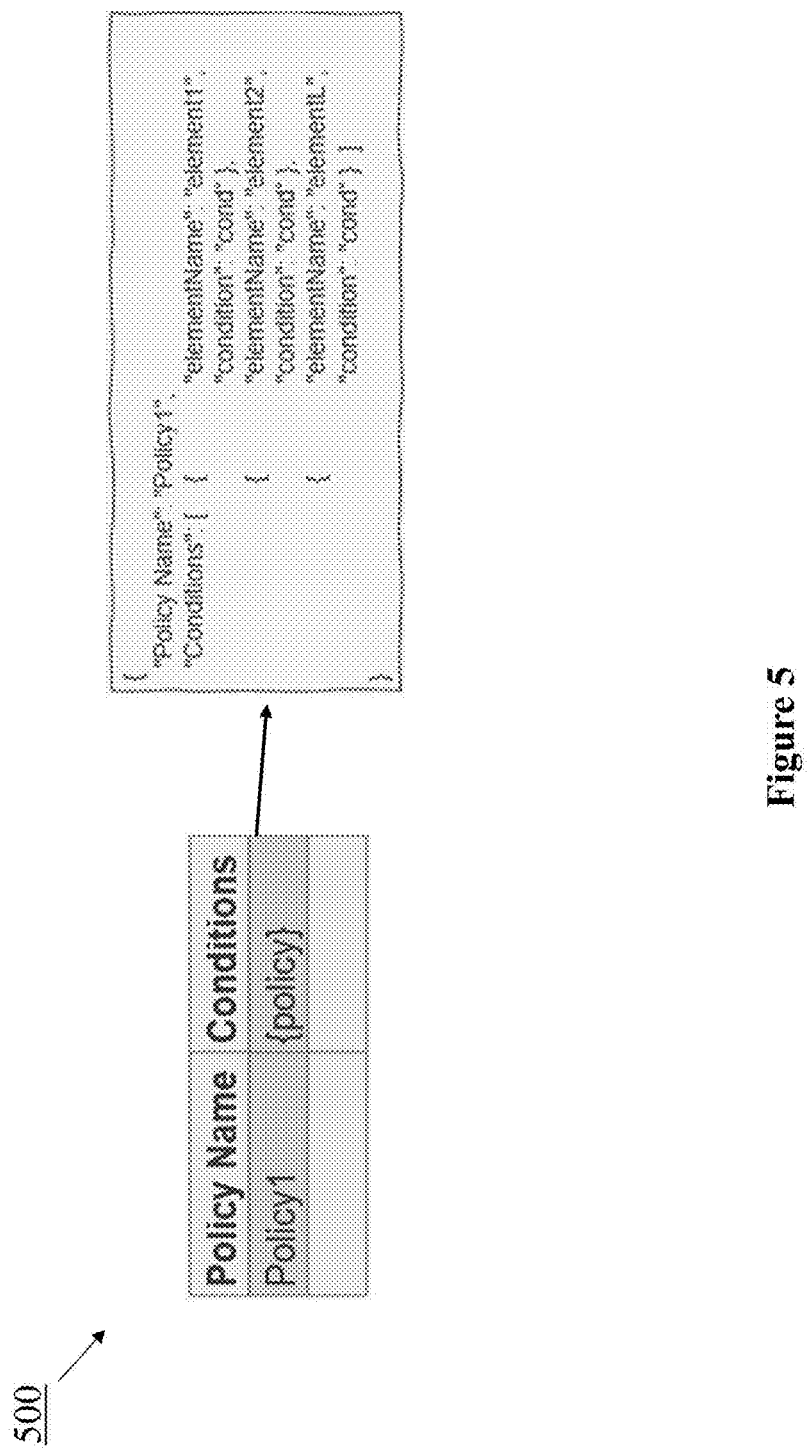
FIG. 5 is a diagram which illustrates a quality plan having a plurality of conditions for parameters, in accordance with some embodiments of the present invention.

According to some embodiments of the present disclosure, the predictive screen recording module 150 may include receiving a quality plan, such as example 400A in FIG. 4A and such as diagram 500 in FIG. 5, that is having conditions for '1' parameters. Then, retrieving a calculated Personal Performance Indication Vector (PPIV) of the agent having the '1' parameters, such as example 400B, in FIG. 4B from the data store, such as data store 160. Then, the predictive screen recording module 150, may compare each parameter in the calculated PPIV to a related condition of the parameter in the quality plan to find a matching level, as shown foe example, in table 600 in FIG. 6. In example 400B in FIG. 4B of PPIV the matching level to the conditions in the example 400A in FIG. 4A of quality plan may be '2'.

According to some embodiments of the present disclosure, the predictive screen recording module 150 may use the matching level to calculate an initial Agent Recording Percentage (iARP) and then normalize the iARP to an ARP value.

According to some embodiments of the present disclosure, the calculating of the retrieved PPIV having the '1' parameters may be performed by operating a PPIV module (not shown), either each time data is updated or alternatively every preconfigured period.

According to some embodiments of the present disclosure, the PPIV module (not shown) may include retrieving metadata parameters of interactions of the agent during a preconfigured period from a data store of interactions details (not shown). Then, an average of each parameter of the retrieved metadata parameters may be calculated.

According to some embodiments of the present disclosure, the PPIV module (not shown) may further include retrieving Quality Management (QM) data parameters of the agent during a preconfigured period from a data store associated with a QM application and then calculating an average of each parameter of the retrieved QM data parameters.

According to some embodiments of the present disclosure, the PPIV module (not shown) may include using the average of each parameter of the retrieved metadata parameters and the average of each parameter of the retrieved QM data parameters to calculate the PPIV having the '1' parameters. For example, a PPIV of an agent may be an agent identifier, as shown by example 400B in FIG. 4B.

According to some embodiments of the present disclosure, the '1' parameters of the calculated PPIV may be preconfigured via an input device, such as input device 25, according to the '1' parameters of the quality plan.

According to some embodiments of the present disclosure, the parameters of the metadata of the interactions of the agent may be selected from at least one of: interaction duration, number of holds, hold durations, number of transfers, customer sentiment, after call work duration and any combination thereof.

According to some embodiments of the present disclosure, the QM data parameters may be selected from at least one of: agent QM score, agent seniority, agent Customer Satisfaction Score (CSAT), agent First Call Resolution (FCR) and any combination thereof.

According to some embodiments of the present disclosure, the quality plan having '1' parameters and related conditions including parameters, which may be selected from at least one of: agent seniority, agent CSAT, agent FCR, interaction duration, number of holds, hold durations, number of transfers, customer sentiment, after call work duration, and any combination thereof.

According to some embodiments of the present disclosure, the matching level may be one of '1+1' matching levels, as shown in table 600 in FIG. 6.

According to some embodiments of the present disclosure, the calculating of the iARP may be based on formula I:

for $(0==n<=L)$ $$iARP_n = MAX[B, n*W_n] \quad (I)$$

whereby:
n is a matching level,
L is a length of PPIV,
B is a preconfigured minimal allowed recording percentage, and
Wn is a weight factor per each parameter of PPIV and it may be calculated based on formula II:

$$W_n = 100/L. \quad (II)$$

According to some embodiments of the present disclosure, the normalizing of the calculated iARP to the ARP may be performed based on formula III:

for $(0==n<=L)$ $$ARP_n = MAX[B, F*iARP_n] \quad (III)$$

whereby:
n is a matching level,
B is a preconfigured minimal allowed recording percentage,
M is a preconfigured maximal recording percentage,
F is a preconfigured factor, and it is calculated based on formula (IV):

$$F = M/MAX[iARP_n]. \quad (IV)$$

iARPn is an initial ARP for an 'n' matching level.

According to some embodiments of the present disclosure, the operating of the recording of screen events module 140 for recording one or more voice or digital interactions, on one or more screens, such as output device 55 which may be associated to the computing device of the agent 110, may be performed when a randomly generated number that is between 0 and 100, is below the yielded ARP value. The yielded ARP value is calculated such that low-level agents may have a low ARP value thus, the statistic chances of a random number under the low ARP value are low and vice versa. High-level agents may have a high ARP value, thus, the statistic chances of a random number under the high ARP value are high.

According to some embodiments of the present disclosure, the agent's Quality Management (QM) rating and call history metadata may be averaged with the agent's historical recording and stored as a Personal Performance Indication Vector PPIV to determine the agent personal performance quality. The recording percentage of each of the agents may be set according to the performance of the agent quality rating during the interactions, such that agents having good quality rating, e.g., high-level agents may have a higher ARP value, e.g., a higher call recording percentage and agents having a low quality rating, e.g., low-level agents may have a lower ARP value e.g., a lower call recording percentage.

According to some embodiments of the present disclosure, high-level agents may be calculated a higher recording percentage, while low-level agents may have a lower call recording percentage during a shift or any other preconfigured period. By this calculation, the recording decision may be personalized and based on the agent's historical calls quality.

According to some embodiments of the present disclosure, the ARP value of each agent may be displayed via a display unit, such as output device 35.

Figure 2:
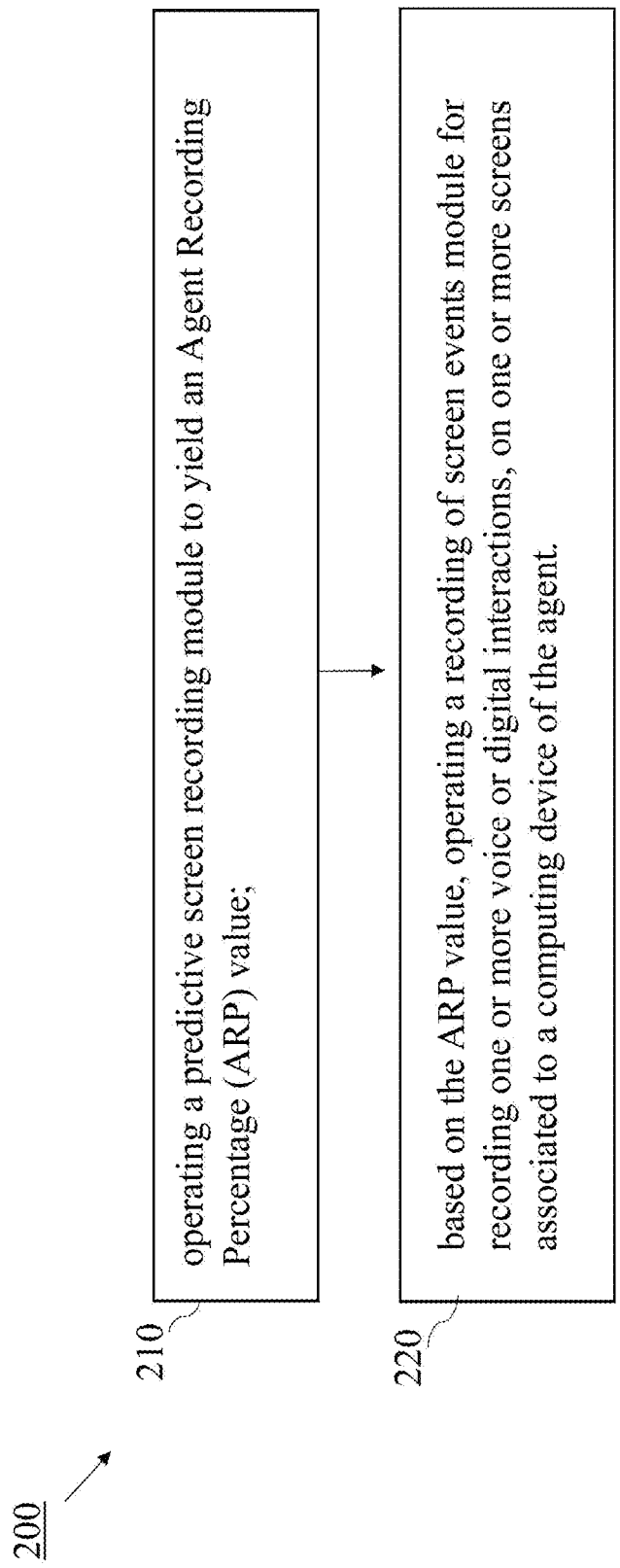
FIG. 2 schematically illustrates a high-level diagram of a computerized-method for a personalized screen recording in a contact center, in accordance with some embodiments of the present invention.

FIG. 2 schematically illustrates a high-level diagram of a computerized-method for a personalized screen recording in a contact center, in accordance with some embodiments of the present invention.

According to some embodiments of the present disclosure, operation 210 may comprise operating a predictive screen recording module to yield an Agent Recording Percentage (ARP) value.

According to some embodiments of the present disclosure, operation 220 may comprise, based on the ARP value, operating a recording of screen events module for recording one or more voice or digital interactions, on one or more screens, such as output device 55 in FIG. 1, which are associated to a computing device of the agent, such as agent's computing device 110 in FIG. 1.

According to some embodiments of the present disclosure, the recording of screen events module may be a module, such as recording of screen events module 140 in FIG. 1.

Figure 3:
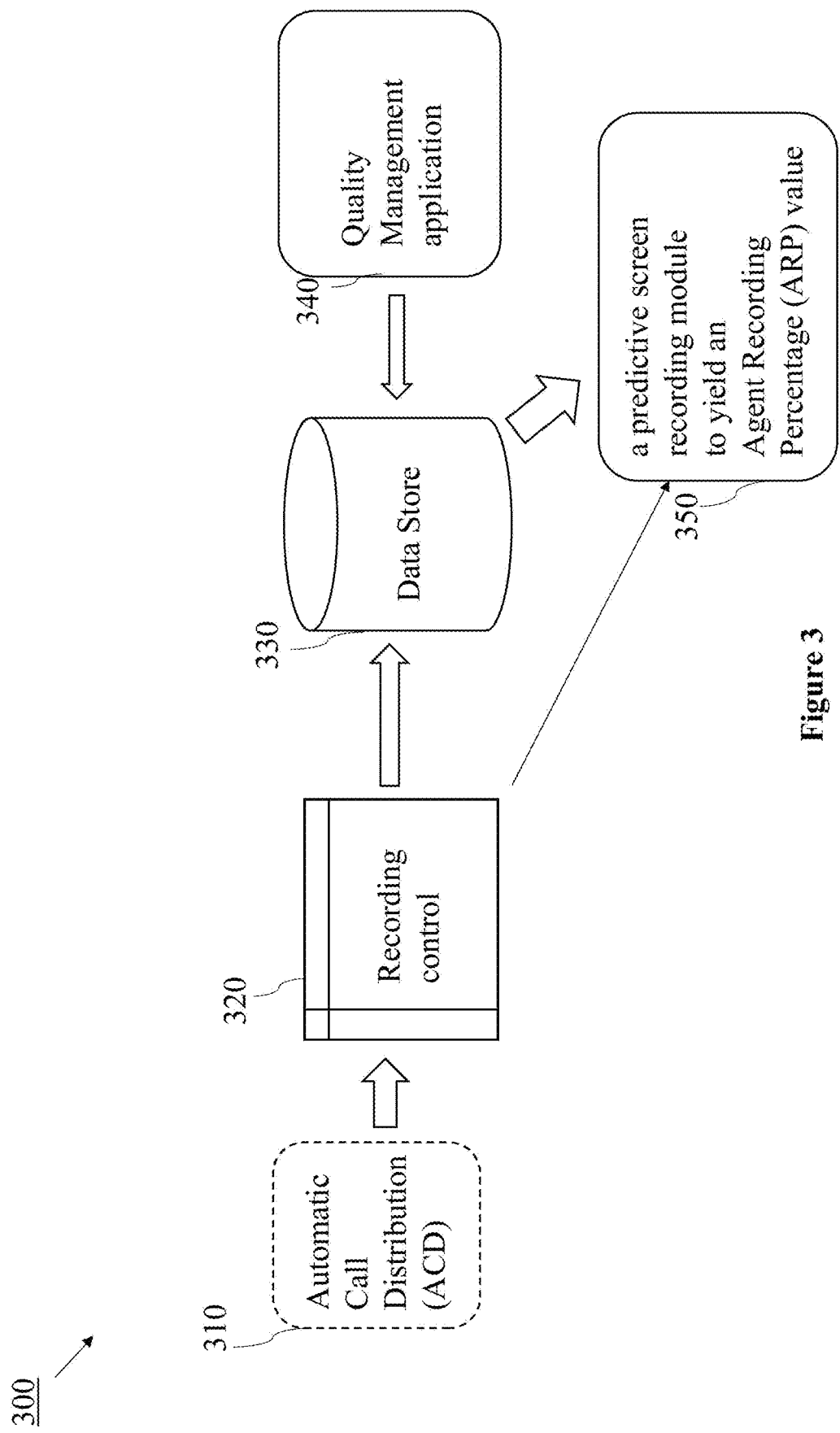
FIG. 3 schematically illustrates a high-level diagram of a computerized-system for a personalized screen recording in a contact center, in accordance with some embodiments of the present invention.

FIG. 3 schematically illustrates a high-level diagram of a computerized-system 300 for a personalized screen recording in a contact center, in accordance with some embodiments of the present invention.

According to some embodiments of the present disclosure, an omnichannel routing system, such as Automatic Call Distribution (ACD) system 310, may route an interaction to an agent in a contact center. A recording control 320 of voice recorder and screen recorder for screen recording service that is running on agent's computing device, such as screen recording service 105 in FIG. 1, may be operated based on the Agent Recording Percentage (ARP) value. A module, such as recording of screen events module 140 in FIG. 1, may be operated to record one or more voice or digital interactions, on one or more screens associated to a computing device of the agent, such as agent's computing device via the screen recording service 105. A voice recorder may record the voice part of the agent interaction and the screen recorder may record the agent's desktop screen.

According to some embodiments of the present disclosure, metadata of each interaction of the agents, may be forwarded and maintained in a data store, such as data store 330 and such as data store 160 in FIG. 1. Agent's Quality Management (QM) data from a QM application 340 may be also stored in the data store 160. A QM application 340 is an application that is used for evaluating agents' performance and provide rating thereof, e.g., agents QM rating.

According to some embodiments of the present disclosure, before each interaction between an agent and a customer, the recording control 320 may operate a predictive screen recording module to yield an Agent Recording Percentage (ARP) value 350. The predictive screen recording module may be a module such as predictive screen recording module 150 in FIG. 1.

According to some embodiments of the present disclosure, the predictive screen recording module 150 may include receiving a quality plan having conditions for '1' parameters, such as example 400A in FIG. 4A, which has 4 conditions for 4 parameters. Then, retrieving a calculated Personal Performance Indication Vector (PPIV) of the agent having the '1' parameters, from the data store.

According to some embodiments of the present disclosure, the predictive screen recording module 150 may further include comparing each parameter in the calculated PPIV to a related condition of the parameter in the quality plan to find a matching level and calculating an initial Agent Recording Percentage (iARP) and then normalizing the calculated iARP to an ARP value.

According to some embodiments of the present disclosure, the calculated PPIV may be averaged data elements based on the agent historical QM rating and call history metadata, which may be stored in a data store, such as data store 330. The ARP value, may be used by the recording control 320 to decide whether to operate a recording of screen events module, such as recording of screen events module 140 in FIG. 1, for recording one or more voice or digital interactions, on one or more screens associated to a computing device of the agent.

According to some embodiments of the present disclosure, the predictive screen recording module 350 may run periodically to adapt the agent's PPIV to new incoming data.

FIGS. 4A-4B shows an example of quality plan parameters 400A and agent Personal Performance Indication Vector (PPIV) 400B, in accordance with some embodiments of the present invention.

According to some embodiments of the present disclosure, as shown in example 400A, calls metadata may include call duration Number of holds, Hold durations, Number of transfers, Customer Sentiment, After Call Work duration, Quality Management (QM) data: (partial list), Agent QM score, Agent Seniority, Agent CSAT, Agent First Call Resolution.

According to some embodiments of the present disclosure, each of the data elements may be averaged to its historical data, per every agent. As a result, for each of the agents, a Personal Performance Indication Vector (PPIV) of the averaged data elements may be calculated. This vector may be used to determine the overall agent performance level. The PPIV may be stored in a datastore, such as data store 330 and such as data store 160 in FIG. 1 and recalculated every time new data is available or periodically.

According to some embodiments of the present disclosure, as shown in example 400B, the data elements that compose the agent's PPIV may be derived from the data elements that are set in the quality plan policy. The quality plan policy may be configured by a user, such as the recording system administrator, in accordance with the customer business needs. It is composed of a list of conditions on the data elements, e.g., call metadata and QM data. The quality policy may be stored on the data store, such as data store 330 in FIG. 3 and may be used by the predictive screen recording module 150 in FIG. 1 to yield an Agent Recording Percentage (ARP) value 350 for the recording control.

FIG. 5 is a diagram 500 which illustrates a quality plan having a plurality of conditions for parameters, in accordance with some embodiments of the present invention.

According to some embodiments of the present disclosure, a quality plan may have a plurality of conditions for a plurality of parameters, as shown in diagram 500. The quality plan may include an element, e.g. a parameter and a condition. The quality plan may be implementing a quality policy which may be a system-wide policy that affects all the agents.

FIG. 6 is a table 600 showing an example of matching levels of agents, in accordance with some embodiments of the present invention.

According to some embodiments of the present disclosure, a module, such as predictive screen recording module 150 in FIG. 1, may be operated to yield an Agent Recording Percentage (ARP) value. The predictive screen recording module 150 in FIG. 1, may include comparing each parameter in a calculated PPIV of the agent to a related condition of the parameter in the quality plan to find a matching level. For example, as shown in table 600, when the quality policy is a list of conditions, having '1'=4 parameters, such as (AVG CSAT<5), (AVG Negative Sentiment>30%), (AVG #of holds>=1), (AVG Hold Duration>60 sec).

According to some embodiments of the present disclosure, when '1'=4 parameters in the quality policy, then the Personal Performance Indication Vector (PPIV) may have '1'=4 parameters as well to compare to the quality policy parameters to find a matching level. Therefore, there may be '1+1' matching levels including '0' when there are no matches at all.

According to some embodiments of the present disclosure, an initial ARP (iARP) may be calculated and then normalized. For the calculation of iARP, per each of the matching levels, e.g., iARPn, the following parameters may be used: Base Recording Percentage [B] which may be the minimal allowed recording percentage, PPIV length [L] which is the number of data elements in the Personal Performance Indication Vector and Data element weight vector [Wn] which is the weight factor per each of the data element in the PPIV. For simplicity of the explanation, the same weight may be used for each of the data elements e.g., 100/L.

The calculating of the iARP may be based on formula I:

for (0==n<=L)

$$iARPn = MAX[B, n*Wn] \quad (I)$$

According to some embodiments of the present disclosure, the normalized ARP may be calculated by setting a target of the maximal recording percentage to M % to well-performed agents. The normalization factor may be $F=M/\max[iARP_n]$.

To normalize the $iARP_n$ may be based on formula (III):

for (0==n<=L)

$$ARP_n = MAX[B, F*iARP_n] \quad (III)$$

Figure 7:
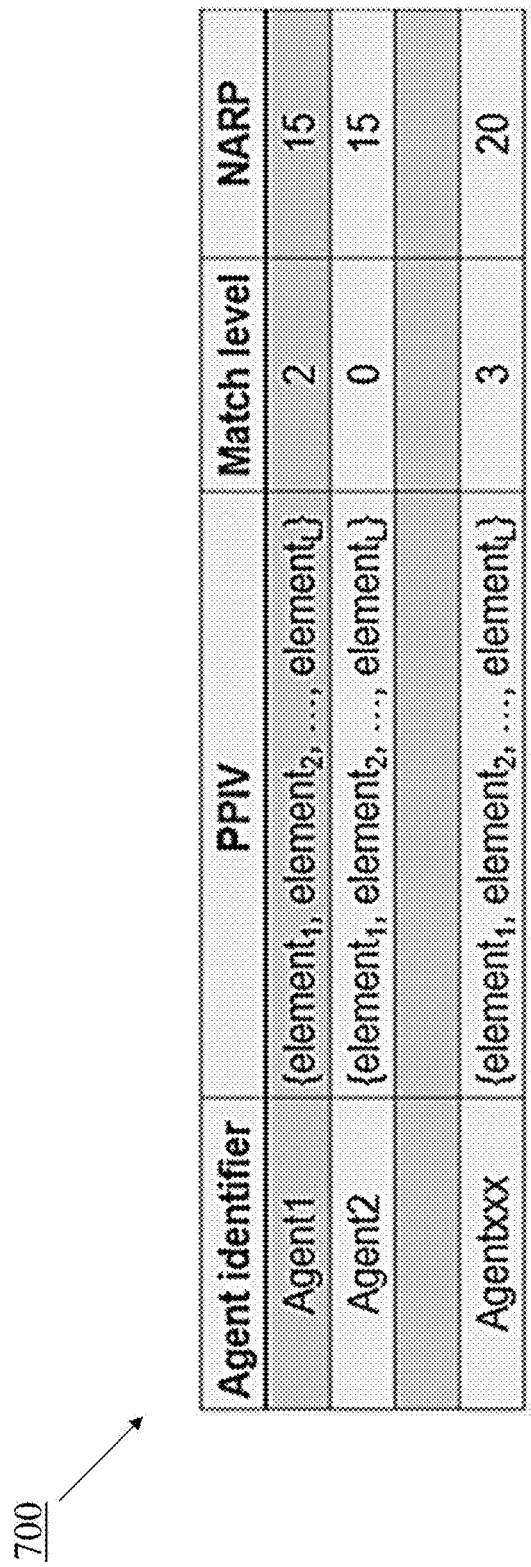
FIG. 7 is a table showing an example of matching levels of agents and related Normalized Agent Recording Percentage (NARP), in accordance with some embodiments of the present invention.

FIG. 7 is a table 700 showing an example of matching levels of agents and related Normalized Agent Recording Percentage (NARP), in accordance with some embodiments of the present invention.

According to some embodiments of the present disclosure, for each agent the following data has to be stored in a data store, such as data store 160 in FIG. 1, by an agent identifier: PPIV, quality plan policy matching level, and the normalized ARP (NARP). At the beginning of each interaction in the contact center, the decision to record the interaction may be based on the NARP value, e.g., when the NARP is below a generated random number that is between 0 and 100.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for a personalized screen recording in a contact center, said computerized-method comprising in a system having one or more processors, a data store, a memory to store the data store, a communication interface to communicate via a communication network with one or more agent computing devices, before each interaction between au agent and a customer, said one or more processors are configured to operate a predictive screen recording module to yield an Agent Recording Percentage (ARP) value, wherein said predictive screen recording module comprising:

receiving a quality plan having conditions for '1' parameters;

retrieving a calculated Personal Performance Indication Vector (PPIV) of the agent having the '1' parameters, from the data store;

comparing each parameter in the calculated PPIV to a related condition of the parameter the quality plan to find a matching level;

calculating an initial Agent Recording Percentage (iARP); and normalizing the calculated iARP to an ARP value, and based on the ARP value, said one or more processors are configured to operate a recording of screen events module for recording one or more voice or digital interactions, on one or more screens associated to a computing device of the agent.

2. The computerized-method of claim 1, wherein the calculating of the PPIV having the '1' parameters is performed by operating a PPIV module, said PPIV module comprising:

retrieving; metadata parameters of interactions of the agent during a preconfigured period from a data store of interactions details;

calculating an average of each parameter of the retrieved metadata parameters;

retrieving Quality Management (QM) data parameters of the agent during a preconfigured period from a data store associated with a QM application;

calculating an average of each parameter of the retrieved QM data parameters; and using the average of each parameter of the retrieved metadata parameters and the average of each parameter of the retrieved QM data parameters to calculate the PPIV having the '1' parameters.

3. The computerized-method of claim 2, wherein the parameters of the metadata of the interactions of the agent are selected from at least one of: interaction duration, number of holds, hold durations, number of transfers, customer sentiment, after call work duration and any combination thereof.

4. The computerized-method of claim 2, wherein the QM data parameters are selected from at least one of: agent QM score, agent seniority, agent Customer Satisfaction Score (CSAT), agent First Call Resolution (FCR) and any combination thereof.

5. The computerized-method of claim 2, wherein the quality plan having '1' parameters and related conditions comprising parameters which are selected from at least one of: agent seniority, agent CSA, agent FCR, interaction duration, number of holds, hold durations, number of transfers, customer sentiment, after call work duration, and any combination thereof.

6. The computerized-method of claim 1, wherein the matching level is one of '1+1' matching levels.

7. The computerized-method of claim 1, wherein the calculating of the iARP is based on formula I:

for $(0==n<=L)$ $$\text{iARP}n = \text{MAX}[B, n * Wn] \qquad (I)$$

whereby:

n is a matching level,

L is a length of PPIV,

B is a preconfigured minimal allowed recording percentage, and

Wn is a weight factor per each parameter of PPIV and it is calculated based on formula II:

$$Wn = 100/L. \qquad (II)$$

8. The computerized-method of claim 1, wherein the normalizing of the calculated iARP to the ARP is performed based on formula III:

for $(0==n<=L)$ $$ARP_n = MAX[B, F * iARP_n] \quad (III)$$

whereby:

n is a matching level,

B is a preconfigured minimal allowed recording percentage,

M is a preconfigured maximal recording percentage,

F is a preconfigured factor, and it is calculated based on formula (IV):

$$F = M / MAX[iARP_n], \quad (IV)$$

whereby iARPn is an initial ARP for an 'n' matching level.

9. The computerized-method of claim 1, wherein the operating of the recording of screen events module for recording one or more voice or digital interactions, on one or more screens associated to the computing device of the agent is performed when a randomly generated number is below the yielded ARP value.

10. The computerized-method of claim 1, wherein a calculation of the calculated PPIV is performed when data is updated or every preconfigured period.

11. The computerized-method of claim 1, wherein the '1' parameters of the calculated PPIV are preconfigured according to the '1' parameters of the quality plan.

12. A computerized-system for a predictive screen recording in a contact center, said computerized-system comprising:

one or more processors, a data store, a memory to store the data store, and a communication interface to communicate via a communication network with one or more agent computing devices, before each interaction between an agent and a customer, said one or more processors are configured to:

operate a predictive screen recording module to yield an Agent Recording Percentage (ARP) value, wherein said predictive screen recording module comprising:

receiving a quality plan having conditions for '1' parameters;

retrieving a calculated Personal Performance Indication Vector (PPIV) of the agent having the '1' parameters, from the data store;

comparing each parameter in the calculated PPIV to a related condition of the parameter in the quality plan to find a matching level;

calculating an initial Agent Recording Percentage (iARP), and normalizing the calculated iARP to an ARP value, and based on the ARP value, said one or more processors are configured to operate a recording of screen events module for recording one or more voice or digital interactions, on one or more screens associated to a computing device of the agent.

* * * * *